J. T. Scholte,
Gas Meter.

Nº 57,268.  Patented Aug. 14, 1866.

Witnesses;
W. Bailey
Jos. L. Coomby

Inventor,
J. T. Scholte,
by A. Pollok
Atty.

UNITED STATES PATENT OFFICE.

JEAN THEODORE SCHOLTE, OF PARIS, FRANCE.

IMPROVEMENT IN GAS-METERS.

Specification forming part of Letters Patent No. 57,268, dated August 14, 1866.

*To all whom it may concern:*

Be it known that I, JEAN THEODORE SCHOLTE, of Paris, in the Empire of France, have invented certain new and useful Improvements in Apparatus for Measuring Gas and other Fluids; and I hereby declare the following to be a full, clear, and exact description of the same, reference being had to the accompanying drawings.

This invention relates to gas-meters called "wet-meters"—that is, meters containing water or other liquid which is maintained at a constant level.

The meter constructed in accordance with my invention has for its motive power the pressure of gas, which causes the rotation of a drum furnished with an interior spiral passage, which drum serves to measure the gas and is the main feature or organ of the apparatus. The arrangement of this apparatus will be well understood by reference to the accompanying drawings, in which—

Figure 3:
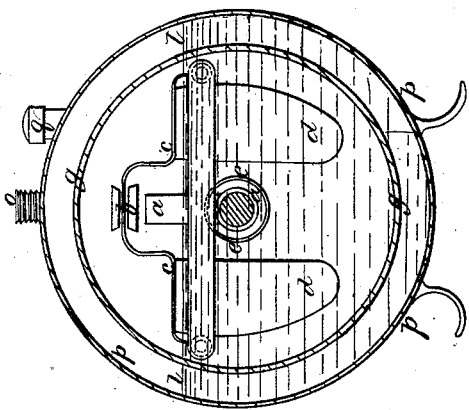
Figure 4:
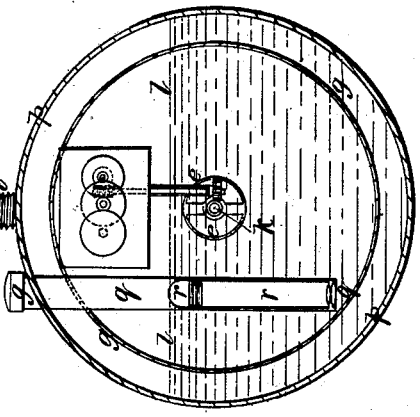
Figure 1:
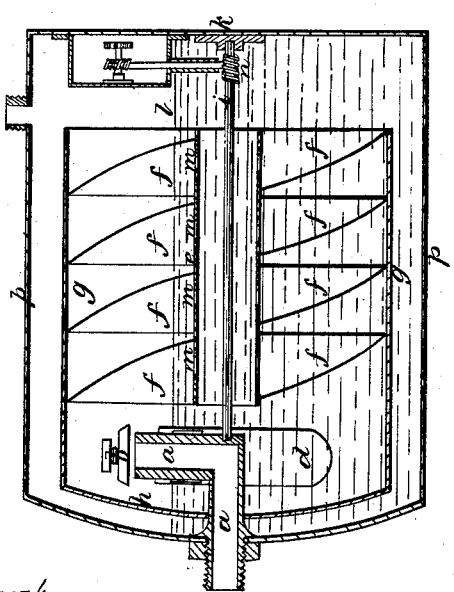
Figure 2:
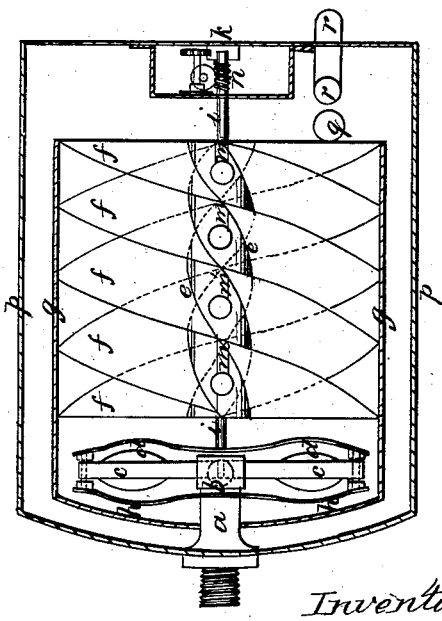

Figure 1 is a longitudinal section through the axis of the meter. Fig. 2 is a sectional plan view. Fig. 3 is a transverse section through the supply-pipe $a$. Fig. 4 is a transverse section near the distributing-pipe $o$.

The metal cylinder $p$ serves as the casing of the apparatus. The metal drum $g$ constitutes, with the spiral partitions $f$ and horizontal tube $e$, the movable portion of the apparatus. Between the end $h$ of the drum $g$ and the orifice of the tube $e$ is placed the pipe $a$, by which the gas is supplied to the meter. The orifice of this pipe is surmounted by a valve, $b$, which is held in place by two arms, $c$ $c$, with two floats, $d$ $d$. The axis $i$ of the drum has its bearings in two boxes, $k$ $k$, placed, the one in the supply-pipe $a$ and the other against the end of the metal case $p$.

The screw $n$, placed at the extremity of the axis $i$, is intended for registering each revolution of the helical drum $g$. The number of revolutions is indicated by the ordinary mechanism shown in the drawings. The escape of the registered gas takes place through the orifice $o$, through which the gas is conducted to the burners. The liquid is introduced into the meter by the pipe $q$.

The proper level of the water in the meter is indicated by the line $l$ $l$.

In Fig. 1 it is seen that the liquid circulates freely in the interior of the drum $g$ through the tube $e$, open at each end, and having openings $m$ formed in its side. The excess of liquid escapes by the tube $r$, Fig. 4. The two tubes, $q$ and $r$, extend nearly to the bottom of the case $p$.

When the water in the meter is at its proper level $l$ $l$, the floats $d$ $d$ keep the valve $b$ open. The gas, which flows through the tube or pipe $a$, enters the interior of the drum through the opening made by the valve $b$ and strikes against the spiral partition $f$. The pressure of the gas then acts as a motor on the helical drum $g$, which revolves on its axis $i$, the gas following the course of the spiral partitions $f$, the number and dimensions of which vary according to the size of the meter, and when the gas quits the last spiral partition it is carried to the burners through the conducting-pipe $o$.

It is consequently seen that the quantity of gas distributed by the helical drum at each revolution is equal to the capacity of all that part of the meter not filled with water. The uniformity of the water-level, being essentially requisite for the precise action of the meter, is maintained by the arrangement of the valve $b$, suspended by the arms $c$ $c$, attached to the floats $d$ $d$.

From this arrangement it follows that if the water-level falls only one or two millimeters the floats $d$ $d$, by means of the arms $c$ $c$, will cause the valve $b$ to close, and thus interrupt the flow of gas. The consumer, therefore, is obliged to fill the meter to the proper level in order to raise the valve $b$ and to re-establish the circulation of the gas. The water-level is prevented from rising to too great a height by the regulating-pipe $r$, which draws off the excess of water. To this end the mouth of this pipe is on a level with the water-line $l$ $l$. The apparatus thus arranged and combined enables one to have perfect control over the gas, however variable may be the consumption of the gas, and renders all fraud on the part of the consumer impossible. Another advantage resulting from this arrangement is that there is no danger of explosion.

This apparatus can be made of all forms, dimensions, and materials, in order to measure gas and other fluids. The spiral drum can be placed in a register for the measure of liquids.

Having thus described my invention, what

I claim, and desire to secure by Letters Patent, is—

1. The apparatus for measuring gas, as herein shown and described, the same consisting of the following elements combined: first, a drum with interior spiral partitions actuated by the gas, as herein shown and set forth; second, a valve, together with floats, so arranged that it may open and close automatically; third, a regulating or discharge pipe for carrying off all water in excess of the proper level.

2. In apparatus for measuring gas or other fluids, as specified, the drum provided with interior spiral partitions and actuated as herein shown and set forth.

In testimony whereof I have signed my name to this specification before two subscribing witnesses.

J. T. SCHOLTE.

Witnesses:
  A. GRAUSTROEN,
  E. SHERMAN GOULD.